US006874640B2

(12) United States Patent
Bulatovic

(10) Patent No.: US 6,874,640 B2
(45) Date of Patent: Apr. 5, 2005

(54) PROCESS FOR SEPARATION OF BASTNAESITE FROM WEATHERED BASTNAESITE BARITE FLUORITE ORES

(75) Inventor: Srdjan Bulatovic, Peterborough (CA)

(73) Assignee: Sumiko Consultants Co., Ltd., Tokyo (JP)

(*) Notice: Subject to any disclaimer, the term of this patent is extended or adjusted under 35 U.S.C. 154(b) by 36 days.

(21) Appl. No.: 10/334,987

(22) Filed: Jan. 2, 2003

(65) Prior Publication Data

US 2003/0213730 A1 Nov. 20, 2003

(30) Foreign Application Priority Data

Feb. 22, 2002 (JP) ...................................... 2002-045901

(51) Int. Cl.[7] ............................ B03D 1/02; B03D 1/06; B01D 1/012

(52) U.S. Cl. ...................................... 209/166; 209/167

(58) Field of Search ................................ 209/166, 167; 252/61

(56) References Cited

U.S. PATENT DOCUMENTS 4,853,113 A * 8/1989 Bulatovic .................. 209/166

FOREIGN PATENT DOCUMENTS

JP 55-119456 * 9/1980

* cited by examiner

*Primary Examiner*—Thomas M. Lithgow
(74) *Attorney, Agent, or Firm*—Finnegan, Henderson, Farabow, Garrett & Dunner, L.L.P.

(57) ABSTRACT

The present invention provides a process for the recovery of bastnaesite and other minerals containing rate earth oxide from complex, weathered ores containing barite, borite, fluorites and/or barite, fluorites, silicates and iron oxides, and comprises reverse barite flotation using a barite collector containing the following individual reagents:

| | |
|---|---|
| 1. Petroleum sulphonate | 30–40% by weight |
| 2. Sulphosuccinate | 30–40% by weight |
| 3. Sulphosuccinamate | 30–40% by weight |

9 Claims, 2 Drawing Sheets

Figure No.1 Conventional Flowsheet For Beneficiation Of Bastnaesite Ores Containing Barite And Fluorite
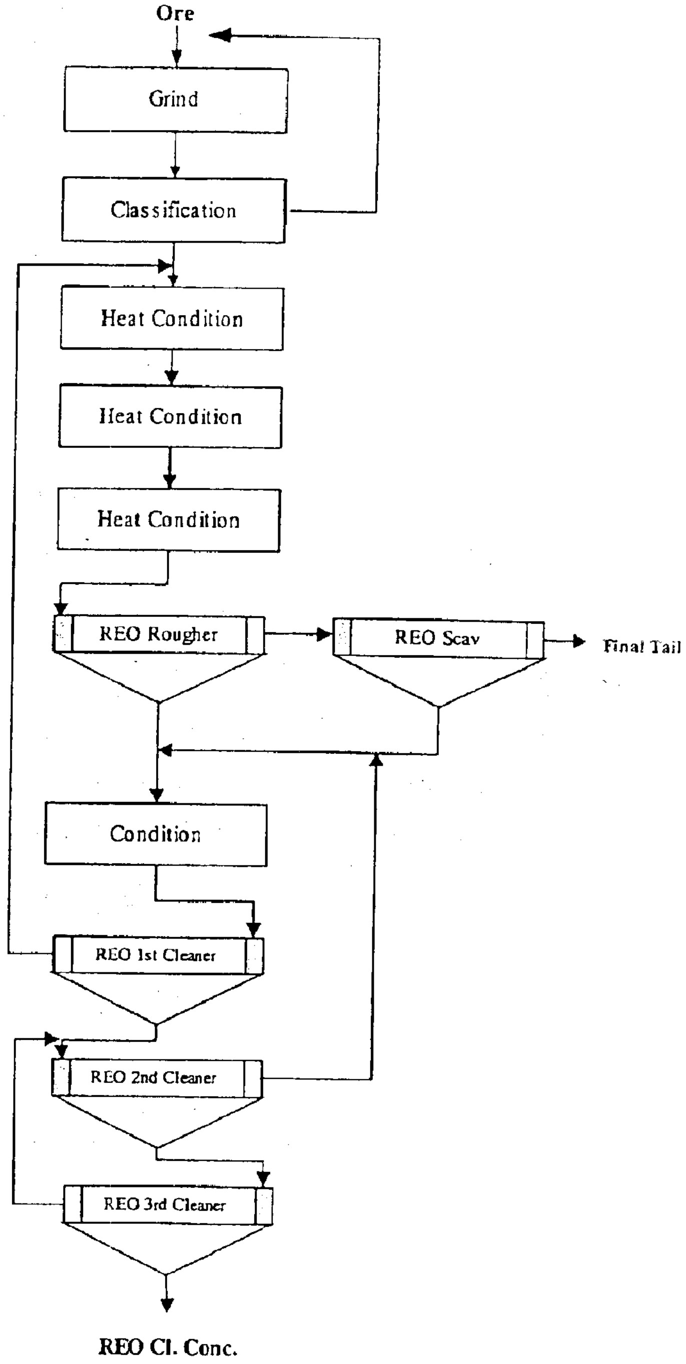

Figure No.2 New Processing Flowsheet For Beneficiation Of Complex Bastnaesite, Barite, Fluorite Ore
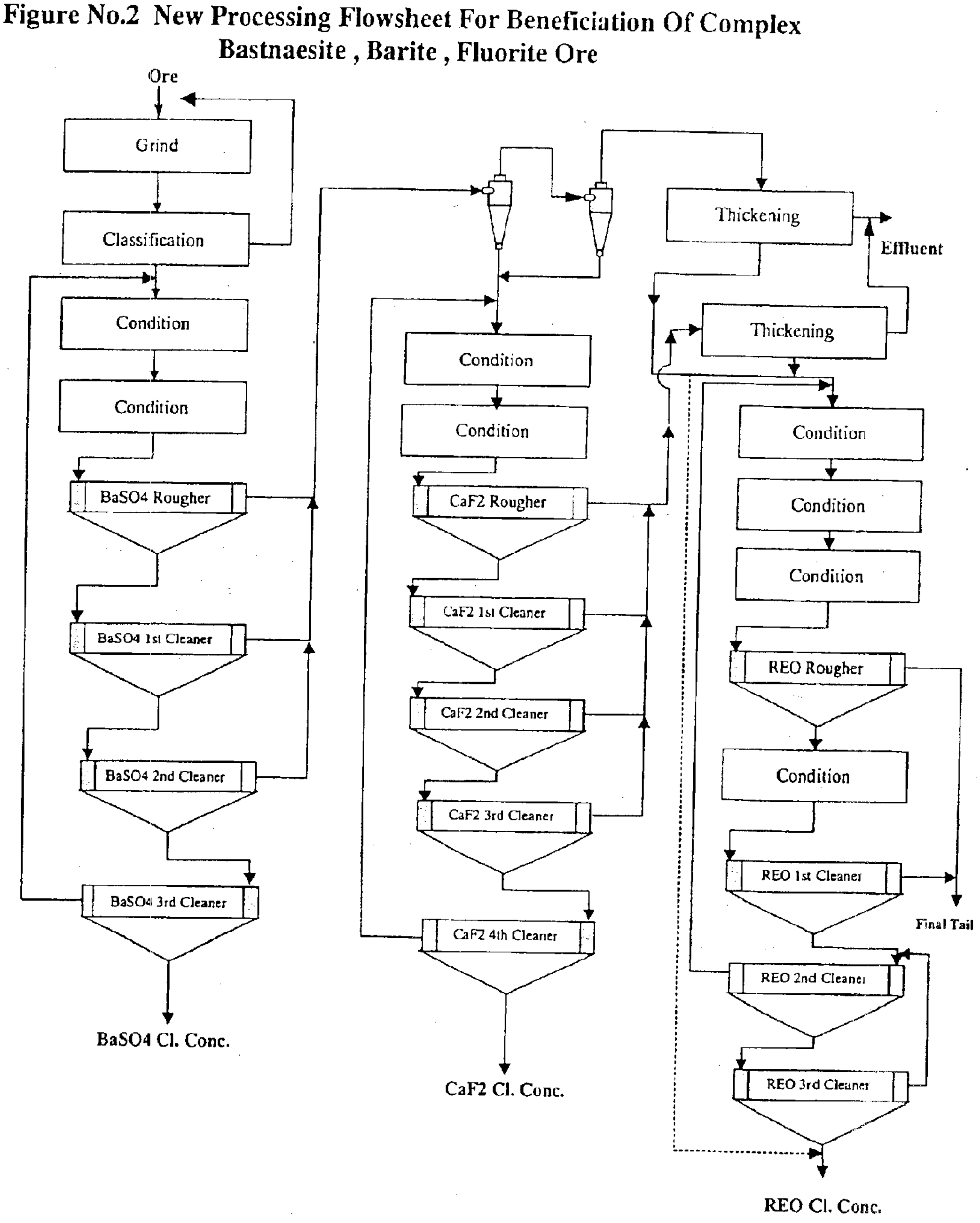

PROCESS FOR SEPARATION OF BASTNAESITE FROM WEATHERED BASTNAESITE BARITE FLUORITE ORES

BACKGROUND OF THE INVENTION

1. Field of the Invention

The present invention relates to a process for separation of bastnaesite and other rare earth minerals from complex, weathered ores containing barite, fluorite, bastnaesite, monazite or other rare earth minerals using a flotation process. The flotation process involves reverse stage flotation of barite, followed by flotation of fluorite and at the end, bastnaesite. Each flotation stage involves the use of innovative, modification and flotation agents.

2. Description of Prior Art

In the art, a limited number of processes are known for treatment of various ores containing bastnaesite, mainly from unaltered ores. One such process is presented in the U.S. Pat. No. 4,772,382 (September 1988), where a novel collector emulsion is used to recover bastnaesite by flotation from an ore that contains silicates and feldspar. In this case, the slurry of ground material is stage-conditioned with modifying agent and a novel collector emulsion, followed by bastnaesite flotation.

In a published paper, 'An alternative reagent scheme for the flotation of Mountain Pass rare earth ore' in the Proceedings of the XIV International Mineral Processing Congress (Oct. 17–23, 1982—Toronto, Canada), a commercial process was described involving flotation of bastnaesite from the associated gangue minerals of calcite (40%) barite (25%) and silica (8%), using a tall oil fatty acid as a collecting agent, and lignin sulponate+sodium fluorosilicate as a gangue depressing agent at elevated temperature. In order to enhance selectivity, the ore-water slurry is heated to a temperature of 90° C. Furthermore, the Japanese patent 55-119456(3) describes a process for froth flotation of bastnaesite from complex barite, fluorite, and rare earth ores containing bastnaesite as a rare earth mineral. According to this invention, the pulp slurry is conditioned with a sulphonate collecting agent and barite/fluorite are recovered by froth flotation ahead of bastnaesite. The resulting barite/fluorite flotation tailing is reconditioned at an elevated temperature and bastnaesite is separated by flotation from the other gangue minerals.

There are a number of references [3, 4, 5, 6, 7] to processes involving the separate flotation of barite and fluorite from barite/fluorite, barite or fluorite ores, to recover barite and fluorite in separate, marketable products. Neither the barite nor the fluorite flotation processes can be successfully applied in the beneficiation of bastnaesite ores containing barite and fluorite, especially if the ore is altered.

It has been demonstrated that separation of bastnaesite from barite and fluorite altered oxidized ore, using conventional flotation techniques, is not possible.

SUMMARY OF THE INVENTION

The present invention provides a new and improved process for the recovery of bastnaesite and other minerals containing rare earth oxides from complex, weathered ores containing barite, borite, fluorites and/or barite, fluorites, silicates and iron oxides.

It is an important objective of the present invention to provide an effective collector for barite and fluorite.

It is a further important objective of the present invention to provide an effective collecting agent for bastnaesite, which is selective against silicates and iron oxides.

The aforementioned objectives, as well as others, will become apparent to those skilled in the art, from the description appearing hereinafter.

The objectives are met by a reverse sequential flotation process for recovering first barite and fluorite and then bastnaesite, not commonly used in the treatment of complex, altered bastnaesite ores containing barite, fluorite and other gangue minerals.

BRIEF DESCRIPTION OF THE DRAWINGS

FIG. 1: Is a schematic flow diagram showing the typical prior art beneficiation process, normally employed for the treatment of bastnaesite ore containing barite, calcite and fluorite.

FIG. 2: Is a schematic flow diagram illustrating the key embodiments of the present invention. It will be understood that these examples are merely representative and illustrative of the present inventions, whose broader scope is defined in the appended claims.

DETAILED DESCRIPTION OF THE INVENTION

The present invention provides a new beneficiation process, primarily for concentrating bastnaesite value from bastnaesite ores containing barite, fluorite, silicates and iron oxides. Such deposits, as an example, are found in the Pacific Region (i.e. Vietnam, China). These ores are very complex and can not be beneficiated using conventional flotation processes.

A new process has been found for the flotation-separation of barite, fluorite and bastnaesite using sequential reverse flotation and new reagent schemes. According to the new invention, the ore is ground to liberation size, where the individual minerals are free. The ore that was evaluated in developing the process for this invention was ground to about 80% passing 45 micron size, using a conventional grinding technique.

In the following step of this invention, the ground slurry (i.e. solids+water) is subjected to stage-conditioning with sodium silicate (0.5 kg/t–3 kg/t ore), and barium chloride. The sodium silicate is a gangue depressant and the barium chloride is a barite activator. These are standard reagents used in the beneficiation of barite-containing ores.

The slurry is then further conditioned with a new barite collector (SR82) which has been developed for the process of this invention. The new barite collector is an emulsion comprised of the following individual reagents:

| | |
|---|---|
| 1. Petroleum sulphonate | 30–40% by weight |
| 2. Sulphosuccinate | 30–40% by weight |
| 3. Sulphosuccinamate | 20–40% by weight |

The above reagents are mixed and reacted in aqueous solution at 5–20% solution strength, preferably at greater than ambient temperature, before the emulsion is added to the slurry. After conditioning, the barite is readily and selectively floated from bastnaesite and fluorite. As opposed to a conventional collector, the new collector emulsion is highly selective toward barite, so that a high grade barite (95–98% $BaSO_4$), is produced at high recovery over 90%.

The resulting barite flotation tailing is then subjected to a desliming stage. This is a commercially-available process where ultrafine particles, primarily containing bastnaesite, are separated from the coarser particles. More than 95% of the particles in the fine fraction are less than 6 $\mu$m in size.

The deslimed slurry is then stage-conditioned with conventional depressants and modifiers normally used in the beneficiation of fluorite containing ores. Such reagents used in this invention are sodium silicate ($Na_2SiO_3$), sodium-bisulphide ($Na_2S_2O_4$), sodium fluorite (NaF) and starch.

Following conditioning, fluorite is floated with a new collector that has been found to be particularly well suited to the treatment of complex ore types that are the subject of this invention. The new fluorite collector, AV-F2, is a reaction product of ethylene tetra amine and oleic acid, where a condensate of oleic acid with the general formula:

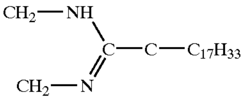

is produced. This new chemical product is further reacted with alkyl ether phosphate to produce a new, highly effective fluorite collector. The ratio of the amine oleic acid to alkyl ether phosphate is 70% to 30%. Other ratios can also be used, and this needs to be optimized based on the type and characteristics of the ore used. It has been found that the advantage of this new collector, as compared to conventional fluorite collectors, is that selectivity between bastnaesite and fluorite is significantly improved. It has been found that the new fluorite collector represents an extremely effective collector for the flotation of fluorite from complex ores. It has also been found that removal of fluorite is essential for the successful subsequent flotation of bastnaesite.

The third and final step of the new process is the recovery of bastnaesite. The bastnaesite in the flotation feed is upgraded threefold during reverse flotation of barite and the fluorite. For example, the bead assay of the ore treated in the development of this new invention is about 8% REO. The feed to bastnaesite flotation, after barite and fluorite flotation, is 24–26% REO.

For the flotation of bastnaesite, standard regulating agents (modifiers and depressants) are used. Following conditioning, bastnaesite is floated with a new collector that has been found to be particularly well suited to the treatment of complex ore types that are the subject of this invention. The new collector comprises a mixture of aminated tall oil fatty acid and sarcosine, which is then treated with an amine. This flotation agent, collector AGW, consists of the following ratios of individual reagents:

| | |
|---|---|
| a) tall oil fatty acid (aminated) | 60–70% by weight |
| b) sarcosine-type of collector | 20–30% by weight |
| c) secondary amine | 10% by weight |

The amination of the tall oil fatty acid is usually carried out with primary amines. This new collector gives (a) increased selectivity of bastnaesite against iron oxides and silicates, and (b) improved recovery of bastnaesite.

The following examples will demonstrate the effectiveness of the new process for beneficiation of complex bastnaesite ore, based on the present invention. Examples 1 to 3 demonstrate results obtained using the prior-art, a conventional process normally used to treat similar ores containing bastnaesite.

EXAMPLES

Example 1

An ore assaying 59% $BaSO_4$, 5.0% $CaF_2$ and 5% REO was ground to 150 mesh nominal size, and then slurried to 45% solids. The slurry was heated while stage conditioning with the following reagents:

| | |
|---|---|
| $Na_2CO_3$ | 4000 g/t |
| Lignin Sulphonate | 4000 g/t |
| $Na_2SiF_6$ | 1000 g/t |
| Collector MRK | 200 g/t |

The heating temperature was 80° C. and the conditioning time was 20 minutes. Collector MRK was the fatty acid collector. The conditioned pulp was subjected to bastnaesite flotation for 8 minutes, followed by 3 cleaning stages. The metallurgical results obtained are shown in Table 1. It can be seen that very little selectivity was achieved between barite, fluorite and bastnaesite. In fact, a bulk concentrate was produced.

TABLE 1

| | Metallurgical Results | | | | | | |
|---|---|---|---|---|---|---|---|
| | Weight | Assays % | | | % Distribution | | |
| Product | % | $BaSO_4$ | $CaF_2$ | REO | $BaSO_4$ | $CaF_2$ | REO |
| REO 3rd Cleaner Conc | 33.63 | 38.6 | 6.50 | 6.76 | 21.2 | 49.1 | 45.4 |
| REO 1st Cleaner Conc | 62.06 | 54.2 | 5.82 | 5.96 | 54.9 | 81.1 | 73.9 |
| REO Rougher Conc | 87.80 | 58.6 | 5.03 | 5.58 | 84.2 | 99.4 | 98.0 |
| REO Rougher Tail | 12.11 | 80.0 | 0.21 | 0.81 | 15.8 | 0.6 | 2.0 |
| Head (Calculated) | 100.00 | 58.9 | 5.03 | 5.00 | 100.0 | 100.0 | 100.0 |

Example 2

A bastnaesite ore assaying 55.9% $BaSO_4$, 2.06% $CaF_2$ and 12.8% REO was treated the same way as the ore from Example 1, but with higher additions of the depressants, $Na_2SiF_6$ and lignin sulphonate. The reagent additions were as follows:

| | |
|---|---|
| $Na_2CO_3$ | 4000 g/t |
| Lignin Sulphonate | 5000 g/t |
| $Na_2SiF_6$ | 1500 g/t |
| Collector MRK | 200 g/t |

The metallurgical results obtained are shown in Table 2. Although bastnaesite concentrate grade improved, the metallurgical results were poor.

TABLE 2

| | Metallurgical Results | | | | | | |
|---|---|---|---|---|---|---|---|
| | Weight | Assays % | | | % Distribution | | |
| Product | % | $BaSO_4$ | $CaF_2$ | REO | $BaSO_4$ | $CaF_2$ | REO |
| REO 3rd Cleaner Conc | 14.65 | 34.2 | 5.16 | 28.9 | 9.0 | 36.7 | 32.9 |
| REO 1st Cleaner Conc | 54.32 | 60.2 | 3.12 | 14.7 | 58.5 | 82.4 | 62.1 |
| REO Rougher Conc | 81.54 | 58.1 | 2.43 | 13.8 | 84.7 | 96.2 | 87.5 |
| REO Rougher Tail | 18.46 | 46.3 | 0.42 | 8.73 | 15.3 | 3.8 | 12.5 |
| Head (Calculated) | 100.00 | 55.9 | 2.96 | 12.9 | 100.0 | 100.0 | 100.0 |

In Examples 1 and 2, a conventional treatment process was used which is normally employed in beneficiation of similar ores. It was therefore, demonstrated that a conventional (prior art) process can not be successfully used for treatment of this type of ore.

Examples 3 and 4

In Examples 3 and 4, barite was recovered by reverse flotation, ahead of fluorite and bastnaesite, using a standard sulphonate/fatty acid collector (Example 3) and the new barite collector (SR82) from this invention (Example 4). In both examples, the ore was ground to 150 mesh and stage conditioned with the following reagents:

| | Example 3 | Example 4 |
|---|---|---|
| $Na_2SiO_3$ | 2500 g/t | 2500 g/t |
| $BaCl_2$ | 500 g/t | 500 g/t |
| Fatty acid/sulphonate | 600 g/t | — |
| SR82 | — | 600 g/t |

e metallurgical results obtained are shown in Table 3 (Example 3) and Table 4 (Example 4).

TABLE 3

| | Metallurgical Results | | | | | | |
|---|---|---|---|---|---|---|---|
| | Weight | Assays % | | | % Distribution | | |
| Product | % | $BaSO_4$ | $CaF_2$ | REO | $BaSO_4$ | $CaF_2$ | REO |
| $BaSO_4$ Cleaner Conc | 62.61 | 85.0 | 3.3 | 4.8 | 89.0 | 39.0 | 36.6 |
| $BaSO_4$ Rougher Conc | 68.77 | 80.1 | 3.8 | 5.2 | 92.0 | 49.3 | 43.6 |
| $BaSO_4$ Rougher Tail | 31.23 | 15.3 | 8.6 | 14.8 | 8.0 | 50.7 | 56.4 |
| Head (Calculated) | 100.00 | 59.8 | 5.3 | 8.20 | 100.0 | 100.00 | 100.0 |

TABLE 4

| | Metallurgical Results | | | | | | |
|---|---|---|---|---|---|---|---|
| | Weight | Assays % | | | % Distribution | | |
| Product | % | $BaSO_4$ | $CaF_2$ | REO | $BaSO_4$ | $CaF_2$ | REO |
| $BaSO_4$ Cleaner Conc | 56.90 | 98.5 | 0.1 | 0.6 | 95.0 | 1.1 | 4.2 |
| $BaSO_4$ Rougher Conc | 58.19 | 97.6 | 0.2 | 0.8 | 96.1 | 2.2 | 5.8 |
| $BaSO_4$ Rougher Tail | 41.81 | 5.52 | 12.2 | 18.1 | 3.9 | 97.8 | 94.2 |
| Head (Calculated) | 100.00 | 59.1 | 5.20 | 8.05 | 100.0 | 100.0 | 100.0 |

Collector SR82 gave superior barite recovery and selectivity over the standard collector. By removing barite selectively from fluorite and bastnaesite, the bastnaesite was upgraded from 8% REO to 18% REO.

Example 5

Further experiments were conducted to determine the effectiveness of the new fluorite collector. The same ore used in Examples 3 and 4 was first treated to recover barite using the new collector SR82, in the same manner as for Example 4. A fluorite flotation stage was then added, to remove fluorite from the barite tailing. In Example 5, the conventional reagents were used:

| | Barite Circuit | Fluorite Circuit |
|---|---|---|
| $Na_2SiO_3$ | 2500 g/t | 2000 g/t |
| $BaCl_2$ | 500 g/t | — |
| SR82 | 600 g/t | — |
| $Al_2(SO_4)_3$ | — | 800 g/t |
| $NaF_2$ | — | 400 g/t |
| $Na_2S_2O_4$ | — | 400 g/t |
| Oleic Acid | — | 350 g/t |

The depressants, modifiers and collectors used in the fluorite circuit were conventional reagents, normally used in flotation concentration of fluorite from similar ores. The metallurgical results are shown in Table 5.

TABLE 5

Metallurgical Results

| Product | Weight % | Assays % $BaSO_4$ | Assays % $CaF_2$ | Assays % REO | % Distribution $BaSO_4$ | % Distribution $CaF_2$ | % Distribution REO |
|---|---|---|---|---|---|---|---|
| $BaSO_4$ Cleaner Conc | 68.65 | 97.9 | 0.1 | 0.7 | 96.5 | 1.1 | 5.0 |
| $CaF_2$ 3rd Cleaner Conc | 9.59 | 10.1 | 36.6 | 20.2 | 1.6 | 65.0 | 23.6 |
| $CaF_2$ 2nd Cleaner Conc | 12.73 | 10.9 | 30.2 | 21.3 | 2.3 | 71.2 | 33.0 |
| $CaF_2$ Tail (REO Flot'n Feed) | 28.62 | 2.42 | 5.22 | 17.8 | 1.2 | 27.7 | 62.0 |
| Head (Calculated) | 100.00 | 59.5 | 5.40 | 8.22 | 100.0 | 100.0 | 100.0 |

It is clear from this example that the conventional fatty acid collector used for flotation of fluorite, is also a good collector for bastnaesite, and therefore appreciable amounts of bastnaesite would be lost to the fluorite concentrate.

Example 6

The same ore that was used in Examples 3, 4 and 5 was also used in Examle 6. The ore was first treated with the new barite collector SR82, and then with the new fluorite collector AKF2, using the same sequence of reagent additions as for Example 5. The levels and point of reagent additions were as follows:

| | Barite Circuit | Fluorite Circuit |
|---|---|---|
| $Na_2SiO_3$ | 2500 g/t | 2000 g/t |
| $BaCl_2$ | 500 g/t | — |
| SR82 | 600 g/t | — |
| $Al_2(SO_4)_3$ | — | 800 g/t |
| NaF | — | 400 g/t |
| $Na_2S_2O_4$ | — | 400 g/t |
| AKF2 | — | 350 g/t |

The metallurgical results obtained are shown in Table 6.

TABLE 6

Metallurgical Results

| Product | Weight % | Assays % $BaSO_4$ | Assays % $CaF_2$ | Assays % REO | % Distribution $BaSO_4$ | % Distribution $CaF_2$ | % Distribution REO |
|---|---|---|---|---|---|---|---|
| $BaSO_4$ Cleaner Conc | 57.49 | 98.5 | 0.1 | 0.6 | 96.3 | 1.1 | 4.3 |
| $CaF_2$ 3rd Cleaner Conc | 4.64 | 8.6 | 66.1 | 6.3 | 0.8 | 58.5 | 3.7 |
| $CaF_2$ 2nd Cleaner Conc | 6.05 | 9.2 | 60.0 | 7.1 | 0.9 | 69.1 | 5.4 |
| $CaF_2$ Tail (REO Flot'n Feed) | 36.46 | 4.44 | 4.29 | 19.8 | 2.8 | 29.8 | 90.3 |
| Head (Calculated) | 100.00 | 58.8 | 5.25 | 7.98 | 100.0 | 100.0 | 100.0 |

These results clearly showed the effectiveness of the new collector (AKF2) in maintaining a high degree of selectivity between $CaF_2$ and bastnaesite.

Example 7

In this example, the complete process of this invention, as per the flowsheet shown in FIG. 2, was tested. The barite and fluorite circuit was run as per Example 6, and the bastnaesite flotation was conducted using the process of this invention.

The ore for Example 7 was treated for sequential $BaSO_4$—$CaF_2$ flotation, in the same manner as Example 6, using the reagents from the invention. The fluorite tailings and slimes were combined and thickened using a conventional dewatering technique, and stage-conditioned at elevated temperatures. This was followed by bastnaesite flotation and upgrading in three cleaning stages using the new bastnaesite collector AGW. The reagents used and their addition points are as follows:

| | Amount | Stage |
|---|---|---|
| $Na_2CO_3$ | 4000 g/t | Conditioner 1 |
| Citric Acid | 1000 g/t | Conditioner 1 |

-continued

| | Amount | Stage |
|---|---|---|
| Quebracho/Lignin Sulphonate | 1000 g/t | Conditioner 2 |
| Collector AGW | 700 g/t | Conditioner 2 |

The metallurgical results are shown in Table 7.

TABLE 7

Metallurgical Results

| Product | Weight % | Assays % $BaSO_4$ | $CaF_2$ | REO | % Distribution $BaSO_4$ | $CaF_2$ | REO |
|---|---|---|---|---|---|---|---|
| $BaSO_4$ Cleaner Conc | 65.43 | 99.6 | 0.5 | 1.1 | 96.2 | 6.1 | 9.8 |
| $CaF_2$ Cleaner Conc | 8.09 | 9.4 | 45.5 | 5.65 | 1.1 | 68.2 | 6.2 |
| REO Cleaner Conc | 11.30 | 13.7 | 8.6 | 39.0 | 2.3 | 18.0 | 60.0 |
| REO Rougher Conc | 16.83 | 10.0 | 7.50 | 33.0 | 2.5 | 23.3 | 75.6 |
| REO Rougher Tail | 9.65 | 1.37 | 1.34 | 6.44 | 0.2 | 2.4 | 8.4 |
| Head (Calculated) | 100.00 | 67.8 | 5.40 | 7.35 | 100.0 | 100.0 | 100.0 |

By comparing the results from Examples 2 and 7, it can be seen that the new process from the invention gave superior results to those obtained using a conventional process.

Examples 8 to 11

In these examples, flotation experiments were conducted on various types of altered barite/fluorite/bastnaesite ores. The reagent additions were the same as those from Example 6 and Example 7, as indicated below:

| | $BaSO_4$ Circuit | $NaF_2$ Circuit | REO Circuit |
|---|---|---|---|
| $Na_2SiO_3$ | 2500 g/t | 2000 g/t | — |
| $BaCl_2$ | 500 g/t | — | — |
| SR82 (collector) | 600 g/t | — | — |
| $Al_2(SO_4)_3$ | — | 800 g/t | — |
| NaF | — | 400 g/t | — |
| $Na_2S_2O_4$ | — | 400 g/t | — |
| AKF2 (collector) | — | 350 g/t | — |

-continued

| | $BaSO_4$ Circuit | $NaF_2$ Circuit | REO Circuit |
|---|---|---|---|
| $Na_2CO_3$ | — | — | 4000 g/t |
| Citric Acid | — | — | 1000 g/t |
| Quebracho/Lignin Sulphonate | — | — | 1000 g/t |
| AGW (collector) | — | — | 700 g/t |

Table 8 summarizes the results obtained on various ore types with the reagents and process of this invention.

It can be seen that the process of this invention can be applied to a variety of ore types with satisfactory results. Therefore, the new process is superior to the conventional process used for treatment of barite, fluorite, bastnaesite complex ores. Moreover, the collectors developed for flotation of barite and fluorite can be successfully used for treatment of barite and/or mixed barite/fluorite ores. These collectors are superior to those commercially available for treatment of these ores.

TABLE 8

Metallurgical Results

| Example | Ore Type | Product | Wt % | Assays % $BaSO_4$ | $CaF_2$ | REO | % Distribution $BaSO_4$ | $CaF_2$ | REO |
|---|---|---|---|---|---|---|---|---|---|
| 8 | A | $BaSO_4$ Cl Conc | 66.01 | 98.0 | 0.5 | 1.1 | 94.8 | 7.1 | 9.7 |
| | | $CaF_2$ Cl Conc | 6.43 | 12.8 | 45.5 | 6.1 | 1.2 | 65.1 | 5.2 |
| | | REO Cl Conc | 11.71 | 17.2 | 7.53 | 38.9 | 2.9 | 19.6 | 61.0 |
| | | REO Ro Conc | 15.61 | 15.3 | 6.91 | 33.5 | 3.5 | 24.5 | 70.1 |
| | | REO Ro Tail | 11.95 | 2.68 | 1.36 | 9.39 | 0.5 | 3.6 | 15.0 |
| | | Head (Calc) | 100.00 | 68.2 | 4.50 | 7.47 | 100.0 | 100.0 | 100.0 |
| 9 | B | $BaSO_4$ Cl Conc | 31.33 | 99.0 | 0.5 | 0.7 | 85.0 | 0.8 | 0.9 |
| | | $CaF_2$ Cl Conc | 14.78 | 6.5 | 85.6 | 3.01 | 2.4 | 66.0 | 1.8 |
| | | REO Cl Conc | 34.74 | 11.5 | 15.0 | 52.0 | 11.0 | 27.1 | 73.0 |
| | | REO Ro Conc | 46.56 | 9.70 | 13.0 | 46.5 | 12.2 | 32.5 | 87.5 |
| | | REO Ro Tail | 7.33 | 2.07 | 4.33 | 33.1 | 0.4 | 0.7 | 9.8 |
| | | Head (Calc) | 100.00 | 36.5 | 19.2 | 24.8 | 100.0 | 100.0 | 100.0 |

TABLE 8-continued

Metallurgical Results

| Example | Ore Type | Product | Wt % | Assays % BaSO4 | CaF2 | REO | % Distribution BaSO4 | CaF2 | REO |
|---|---|---|---|---|---|---|---|---|---|
| 10 | C | $BaSO_4$ Cl Conc | 24.68 | 94.5 | 1.67 | 1.84 | 90.5 | 1.5 | 2.7 |
| | | $CaF_2$ Cl Conc | 24.01 | 1.12 | 86.2 | 5.90 | 1.0 | 75.0 | 8.4 |
| | | REO Cl Conc | 33.11 | 3.62 | 15.7 | 38.0 | 4.6 | 18.8 | 74.5 |
| | | REO Ro Conc | 44.44 | 4.23 | 13.7 | 30.6 | 7.3 | 22.1 | 80.2 |
| | | REO Ro Tail | 6.87 | 4.46 | 5.79 | 20.7 | 1.2 | 1.4 | 8.7 |
| | | Head (Calc) | 100.00 | 25.8 | 27.6 | 16.9 | 100.0 | 100.0 | 100.0 |
| 11 | D | $BaSO_4$ Cl Conc | 65.95 | 98.9 | 0.50 | 0.64 | 94.3 | 27.5 | 5.0 |
| | | $CaF_2$ Cl Conc | 0.90 | 33.3 | 40.5 | 2.2 | 0.4 | 30.5 | 0.2 |
| | | REO Cl Conc | 14.39 | 20.2 | 0.73 | 38.1 | 4.2 | 8.7 | 65.3 |
| | | REO Ro Conc | 16.20 | 19.3 | 0.97 | 35.4 | 4.5 | 13.1 | 68.3 |
| | | REO Ro Tail | 16.95 | 3.01 | 2.05 | 13.1 | 0.8 | 28.9 | 26.5 |
| | | Head (Calc) | 100.00 | 69.2 | 1.20 | 8.40 | 100.0 | 100.0 | 100.0 |

I claim:

1. A method for beneficiation of bastnaesite ore, comprising:

- grinding the bastnaesite ore and forming a slurry;
- conditioning the slurry with a first collector selective to barite;
- selectively floating and removing barite from the slurry which results in a barite float concentrate and a barite tailing slurry;
- conditioning the barite tailings slurry with a second collector selective to fluorite;
- selectively floating and removing fluorite from the barite tailings slurry which results in a fluorite float concentrate and a fluorite tailings slurry;
- conditioning the flourite tailings slurry with a third collector selective toward said bastnaesite; and
- selectively floating and removing, bastnaesite from the fluorite tailing slurry which results in a bastnaesite float concentrate.

2. The method of claim 1, further including conditioning the slurry with sodium silicate and barium chloride prior to conditioning the slurry with the first collector.

3. The method of claim 1, wherein the first collector includes 30–40% by weight of petroleum sulphonate, 30–40% by weight of sulphonsuccinate, and 20–40% by weight of sulphosuccinamate.

4. The method of claim 1, further including desliming the barite tailings slurry subsequent to selectively floating and removing barite from the slurry.

5. The method of claim 4, further including conditioning the deslimed barite tailings slurry with one or more of sodium silicate, sodium bisulphide, sodium fluorite, and starch.

6. The method of claim 1, wherein the second collector includes a condensate of oleic acid reacted with alkyl ether phosphate.

7. The method of claim 1, wherein the second collector includes amine oleic acid and alkyl ether phosphate.

8. The method of claim 7, wherein a ratio of the amine oleic acid to the alkyl ether phosphate in the second collector is about 0.7 to about 0.3.

9. The method of claim 1, wherein the third collector includes 60–70% by weight of tail oil fatty acid, 20–30% by weight of sarcosine, and about 10% by weight of a secondary amine.

* * * * *